US010056021B2

(12) United States Patent
Kim et al.

(10) Patent No.: US 10,056,021 B2
(45) Date of Patent: Aug. 21, 2018

(54) METHOD AND APPARATUS FOR ADJUSTING LIGHT-EMITTING PIXELS USING LIGHT-RECEIVING PIXELS

(71) Applicant: Samsung Electronics Co., Ltd., Gyeonggi-do (KR)

(72) Inventors: Moonsoo Kim, Seoul (KR); Kwangtai Kim, Gyeonggi-do (KR); Dasom Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 71 days.

(21) Appl. No.: 14/487,357

(22) Filed: Sep. 16, 2014

(65) Prior Publication Data

US 2015/0084997 A1 Mar. 26, 2015

(30) Foreign Application Priority Data

Sep. 25, 2013 (KR) ........................ 10-2013-0113709

(51) Int. Cl.

| | |
|---|---|
| ***G09G 3/32*** | (2016.01) |
| ***G09G 3/36*** | (2006.01) |
| ***G06F 3/041*** | (2006.01) |
| ***G09G 3/20*** | (2006.01) |
| ***G09G 3/3225*** | (2016.01) |

(52) U.S. Cl.

CPC ............. *G09G 3/2003* (2013.01); *G09G 3/20* (2013.01); *G09G 3/3225* (2013.01); *G09G 3/3648* (2013.01); *G09G 2300/0443* (2013.01); *G09G 2300/0452* (2013.01); *G09G 2320/029* (2013.01); *G09G 2320/0233* (2013.01); *G09G 2320/0242* (2013.01); *G09G 2320/0626* (2013.01); *G09G 2320/0666* (2013.01); *G09G 2330/02* (2013.01); *G09G 2330/021* (2013.01); *G09G 2330/027* (2013.01); *G09G 2340/04* (2013.01); *G09G 2340/045* (2013.01); *G09G 2340/0464* (2013.01); *G09G 2360/14* (2013.01); *G09G 2360/144* (2013.01)

(58) Field of Classification Search

CPC ...... G09F 3/2003; G09G 3/3225; G09G 3/20; G09G 3/3648; G09G 2360/144

See application file for complete search history.

(56) References Cited

U.S. PATENT DOCUMENTS

2002/0050974 A1* 5/2002 Rai ...................... G09G 3/3406 345/102
2007/0296685 A1 12/2007 Kang et al.

(Continued)

FOREIGN PATENT DOCUMENTS

EP 2 293 273 A2 3/2011
JP 2011-33720 A 2/2011
KR 10-2011-0103571 A 9/2011

*Primary Examiner* — Kwang-Su Yang
(74) *Attorney, Agent, or Firm* — Cha & Reiter, LLC.

(57) ABSTRACT

Disclosed herein are an apparatus and a method for controlling a screen display in an electronic device. A signal from a light-receiving pixel on a display unit is detected. The display unit comprises light emitting pixels and light receiving pixels arranged in a pattern. The light emitting pixels are adjusted based at least partially on a brightness of light indicated by the signal from the light receiving pixels.

14 Claims, 12 Drawing Sheets

(56) References Cited

U.S. PATENT DOCUMENTS

| | | | | |
|---|---|---|---|---|
| 2009/0200088 | A1* | 8/2009 | Chuang | G06F 3/0412 178/18.01 |
| 2010/0201275 | A1 | 8/2010 | Cok et al. | |
| 2011/0014955 | A1* | 1/2011 | Kim | G02F 1/133603 455/566 |
| 2011/0065474 | A1* | 3/2011 | Won | H02J 7/355 455/556.1 |
| 2011/0134252 | A1 | 6/2011 | Furukawa | |
| 2011/0221888 | A1 | 9/2011 | Choi et al. | |
| 2012/0212467 | A1 | 8/2012 | Kohtoku | |
| 2013/0176283 | A1* | 7/2013 | Nakata | G06F 3/042 345/175 |
| 2014/0010549 | A1* | 1/2014 | Kang | H04B 10/116 398/118 |
| 2014/0128131 | A1* | 5/2014 | Sin | H04M 1/185 455/575.8 |
| 2014/0183269 | A1* | 7/2014 | Glaser | G06F 21/32 235/492 |
| 2015/0015761 | A1* | 1/2015 | Ikeda | H04N 5/23293 348/333.01 |
| 2016/0334851 | A1* | 11/2016 | Shedletsky | G06F 1/1626 |

* cited by examiner

METHOD AND APPARATUS FOR ADJUSTING LIGHT-EMITTING PIXELS USING LIGHT-RECEIVING PIXELS

CLAIM OF PRIORITY

This application claims the benefit of priority under 35 U.S.C. § 119(a) from a Korean patent application filed on Sep. 25, 2013 in the Korean Intellectual Property Office and assigned Serial No. 10-2013-0113709, the entire disclosure of which is hereby incorporated by reference.

TECHNICAL FIELD

The present disclosure relates to an apparatus and a method for controlling a screen display in an electronic device.

BACKGROUND

Electronic devices heretofore, such as mobile phones, may be configured with a touch screen panel that may integrate a display panel and a touch panel. Today's electronic devices may perform various functions and the size of their displays may vary. Such electronic devices generally use a battery and power consumption of the battery may be conserved through various techniques. The display's power consumption may make up a large portion of the device's overall power consumption. Therefore, the display panel may be switched off, when the electronic device is not in use; alternatively, the brightness of the display panel may be controlled by identifying the brightness of its surroundings using an illumination sensor. However, the illumination sensor may be installed in a specific location of the electronic device that is not optimal so that it may be difficult for the sensor to accurately detect the brightness of its surroundings. In turn, the suboptimal placement of the sensor makes it difficult to reduce battery consumption by partially switching off the display panel or controlling its brightness.

SUMMARY

In view of the forgoing, disclosed herein are an apparatus and method for controlling a screen in an electronic device.

In accordance with an aspect of the present disclosure, a method for controlling a screen display is in an electronic device disclosed. The method may include: detecting a signal from a light-receiving pixel on a display unit, the display unit comprising light-emitting pixels and light receiving pixels arranged in a predetermined pattern; and adjusting a display intensity of the light-emitting pixels based at least partially on a brightness of light indicated by the signal from the light receiving pixels and a predetermined threshold of brightness.

In accordance with another aspect of the present disclosure, another method for controlling a screen display in an electronic device is disclosed. The method may include: detecting a signal from a light-receiving pixel of a display unit, the display unit having light-emitting pixels and light receiving pixels arranged in a predetermined pattern across a surface area of the display unit; and switching off light-emitting pixels arranged in a partial area of the display unit, when light is not detected in the partial area of the display unit by the light receiving pixels arranged in the partial area.

In accordance with yet another aspect of the present disclosure, an apparatus for controlling a screen display in an electronic device is disclosed. The apparatus may include: a display unit comprising light-emitting pixels and light-receiving pixels disposed thereon in a predetermined pattern; and at least one processor to: detect a signal from a light-receiving pixel and to adjust a display intensity of the light-emitting pixels based at least partially on a brightness of light indicated by the signal from the light receiving pixels and a predetermined threshold of brightness.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

Hereinafter, examples of the disclosure are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the disclosure.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

An electronic device in accordance with the present disclosure may comprise a display panel having image sensors therein. Namely, the display panel may have a structure in which light-receiving pixels may be commingled with display pixels, and the entire display panel or part of the display panel may be controlled by detecting the brightness of the panel's surroundings using the light-receiving pixels.

The device may further detect the brightness of its surroundings and/or switch off an area of the display or the entire display unit based at least partially on a signal received from the light-receiving pixel.

Here, the light-receiving pixel of the display may comprise an image sensor and may identify a signal in a specific wave band. The drive control of the light-emitting pixel may include a function of changing a user interface ("UI") of the display unit in accordance with a corresponding environment.

Figure 1:
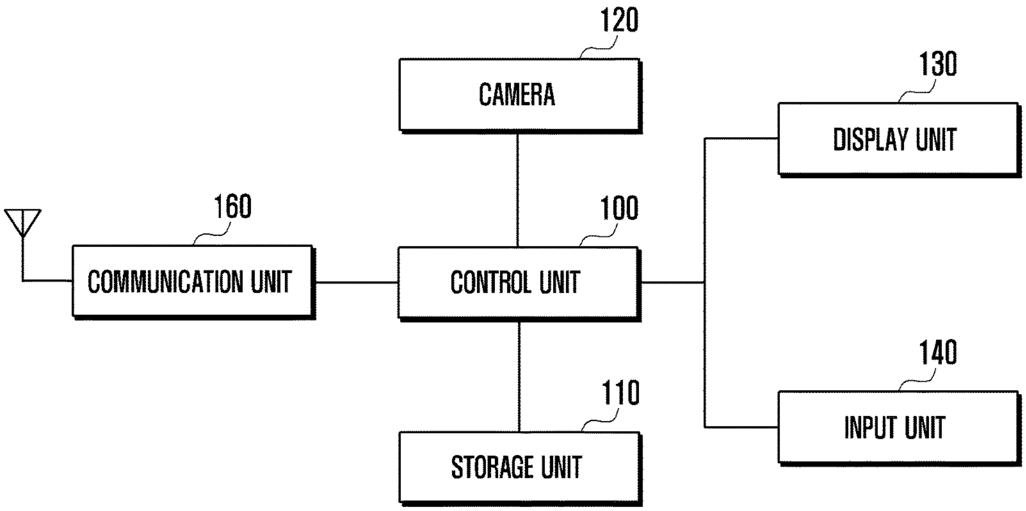
FIG. 1 is a block diagram illustrating an example configuration of an electronic device in accordance with aspects of the present disclosure.

FIG. 1 is a block diagram illustrating an example configuration of an electronic device having a display unit configured with light-receiving pixels. Here, the electronic device may be configured with one of digital equipment such as a mobile phone including a smart phone, MP3 terminal, tablet PC, and laptop computer.

Referring to FIG. 1, a communication unit 160 performs a wireless communication function with a base station or an internet server. The communication unit 160 may be configured with a transmitter for up-converting a frequency of a transmitting signal and amplifying an electric power. Furthermore, communication unit 160 may comprise a receiver for low-noise amplifying and down-converting the frequency of a received signal. Further, the communication unit 160 may include a modulator and a demodulator. The modulator transmits a transmitting signal by modulating and the demodulator demodulates a signal received through the receiver. The modulator and demodulator may include at least one of an LTE, WCDMA, GSM, WIFI, WIBRO, NFC, and Bluetooth. In examples of the present disclosure, the communication unit 160 is assumed to be configured with an LTE, WIFI, and Bluetooth.

A camera 120 includes an image sensor and outputs an external image by detecting and converting the image to an electric signal and digital data. The camera 120 may be configured with a dual camera. In this case, a first camera is installed at the rear side of a device and a second camera is installed at the front bezel area of the device. The first camera may be configured with an image sensor having a higher resolution than the second camera. The first and second cameras may be controlled independently or simultaneously under the control of a control unit 100.

A display unit 130 may include light-emitting pixels for displaying a screen image and light-receiving pixels disposed commingled with the light-emitting pixels in a predetermined pattern. Here, the light-emitting pixels may be RGB pixels and the light-receiving pixels may be image sensors. The display unit 130 may display a screen of an application executing in the electronic device under the control of control unit 100. The light-receiving pixels may generate a signal indicating the surrounding brightness of the whole or partial area of the display unit 130. Such signal may be sent to the control unit 100. In one example, the light-emitting pixel of the display unit 130 may be an LCD or an OLED and the light-receiving pixel may be an image sensor. An input unit 140 generates input signals detectable by control unit 100. The display unit 130 and the input unit 140 may be configured with a touch screen panel in an integral form.

The control unit 100 controls general operations of the electronic device. Control unit 100 may comprise at least one processor which may be any number of processors, such as processors from Intel® Corporation. In another example, the processor may be an application specific integrated circuit ("ASIC"). The control unit 100 may detect brightness by analyzing a signal detected by the light-receiving pixel of the display unit 130. The control unit 100 may adjust the brightness of the display unit 130 in accordance with the surrounding brightness read from the light-receiving pixels. Further, the control unit 100 may identify a partial area of display unit 130 that receives more or less light than other areas and may adjust the light-emitting pixels in the identified area accordingly.

A storage unit 110 may be configured with a memory for storing programs or computer executable instructions that control the brightness of display unit 130, and a data memory for storing photographed images.

Figure 2A:
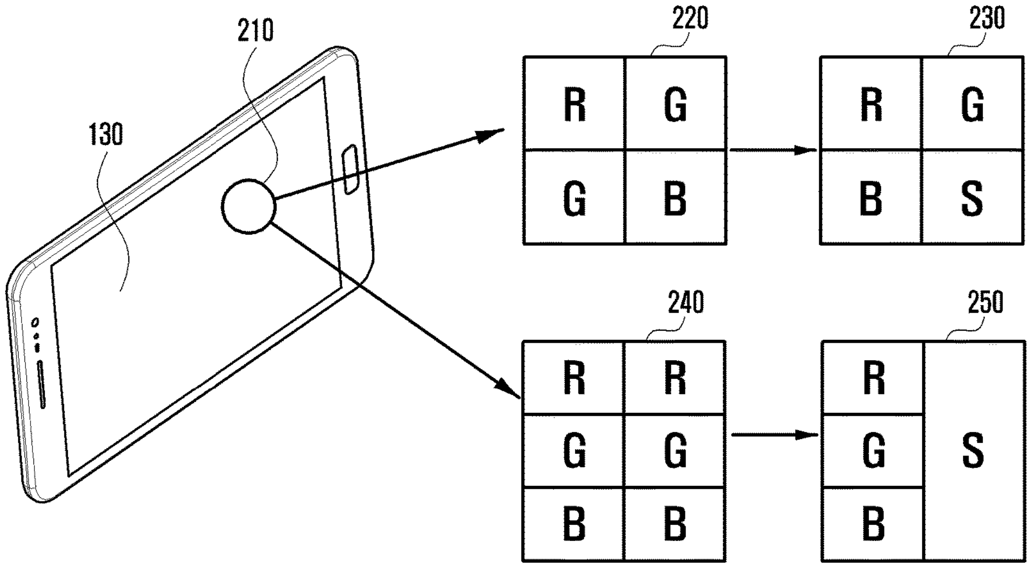
FIG. 2A, FIG. 2B and FIG. 2C are drawings illustrating an example configuration of a display unit with light-receiving pixels in accordance with aspects of the present disclosure.
Figure 2B:
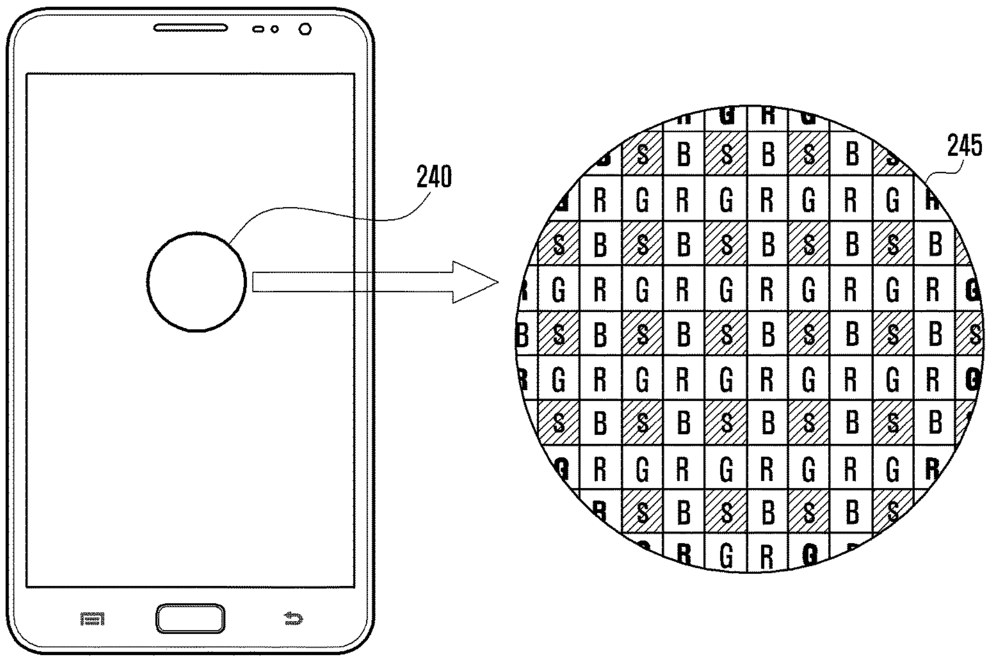
Figure 2C:
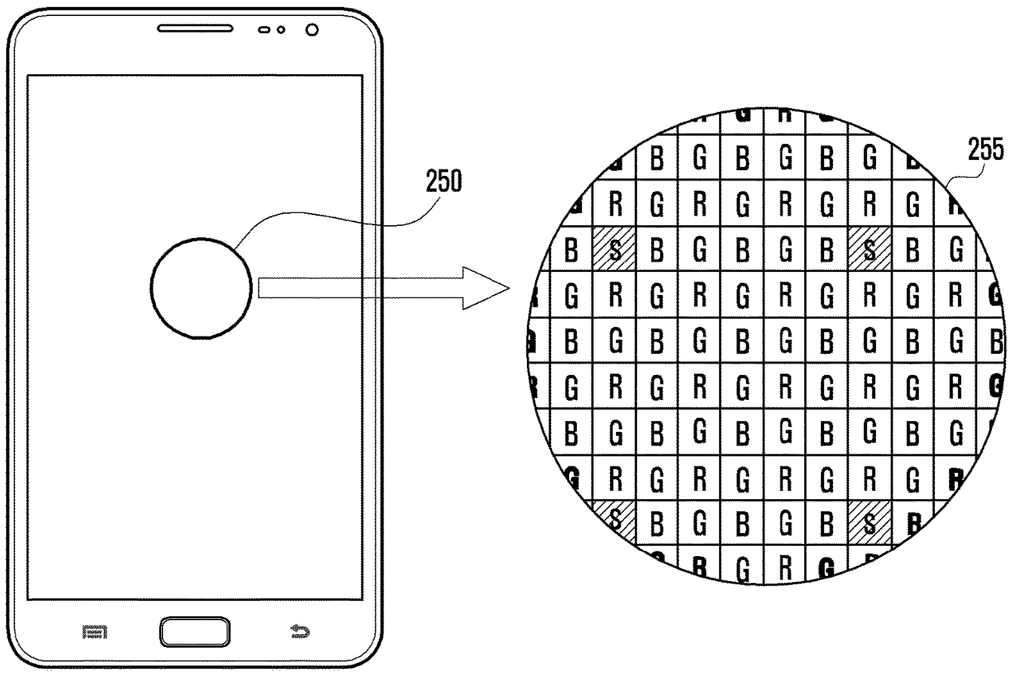

FIGS. 2A-2C illustrate an example configuration of a display unit that include light-receiving pixels for detecting brightness.

Referring to FIG. 2A, the pixels of the example display unit 130 are configured with RGB sub-pixels and may be arranged in various forms. For example unit pixel 210 of FIG. 2A may be a conventional unit pixel with RGBG (red, green, blue, green) sub-pixels 220 or with RGB (red, green, blue) sub-pixels 240. Here, the RGB sub-pixels 240 may be light emitting sub-pixels configured as an LCD, LED, or OLED. These light-emitting pixels may be arranged in various ways. In one example, some of the light-emitting sub-pixels in the conventional unit pixel may be replaced with a light-receiving sub-pixel S. For example, in the RGBG sub-pixels 220, a G pixel may be replaced with a light-receiving pixel S, as shown by sub-pixels 230. Regarding RGBG sub-pixels 240, one column of RGBG pixels may be replaced with a light-receiving sub-pixel S as shown by sub-pixels 250. Thus, a unit pixel may have different patterns of light receiving and light emitting sub-pixels.

When each unit pixel 210 is configured with the pattern of sub-pixels 230, the display unit 130 may have the overall pattern shown in FIG. 2B. If the display unit 130 is configured with the pixel pattern shown in FIG. 2B, the number of light-receiving pixels increases. In turn, an increasing number of light-receiving pixels may deteriorate the quality of the graphics or pictures shown on the display. Such deterioration may be reduced by arranging a pattern of light-receiving pixels that balances the quality of the picture with the need for obtaining the brightness information. Referring to FIG. 2C, one example pattern is shown. In FIG. 2C, a light-receiving pixel may be mounted at every Nth (integer: 2, 3, 4 . . . ) position in a length and width-wise arrangement as shown in example 255. FIG. 2C illustrates an example of mounting the light-receiving pixels at every 3 unit pixels as shown at the corners.

As shown in FIGS. 2A to 2C, the light-receiving pixels are disposed among the RGB pixels of the display unit 130 to detect light. Like a transparent display, a transparent section may be provided in certain areas of the RGB pattern and the light-receiving pixels may be mounted in these sections. Here, alight-receiving pixel of the display unit 130 may be configured with an R, G, or B pixel.

The control unit 100 may control the brightness of the display unit 130 having the above example configuration. The control unit 100 may have at least one reference or threshold value for controlling the brightness of the display unit 130 in accordance with the surrounding brightness and control data for controlling the brightness of the display unit 130 based on the reference value. Further, the control unit 100 may detect the surrounding brightness through the light-receiving pixels of the display unit 130. Since the light-receiving pixels are disposed in a predetermined pattern throughout the surface area of display unit 130, as shown in FIGS. 2B and 2C, control unit 100 may detect the brightness surrounding the surface area of display unit 130. The control unit 100 may adjust the brightness of display unit 130, based at least partially on the brightness detected by the light-receiving pixel. For example, if the brightness is less than the reference value, the brightness of the display may be decreased accordingly.

If a user or an object covers the display unit 130, the light-receiving pixels located in the covered area may not detect light. In this instance, the control unit 100 analyzes signals from the light-receiving pixels indicating that no light is detected in that particular area and switches off the drives of the light-emitting pixels located in that area.

Namely, if a partial area of the display unit 130 is covered by an object, the control unit 100 may switch off the light emitting pixels in that area only while maintaining the light emitting pixels in the other areas. Accordingly, when controlling the drive of the display unit 130, the control unit 100 may simultaneously switch on an area of the display having light-receiving pixels detecting light and switch off another area of the display having light-receiving pixels not detecting light.

Figure 3:
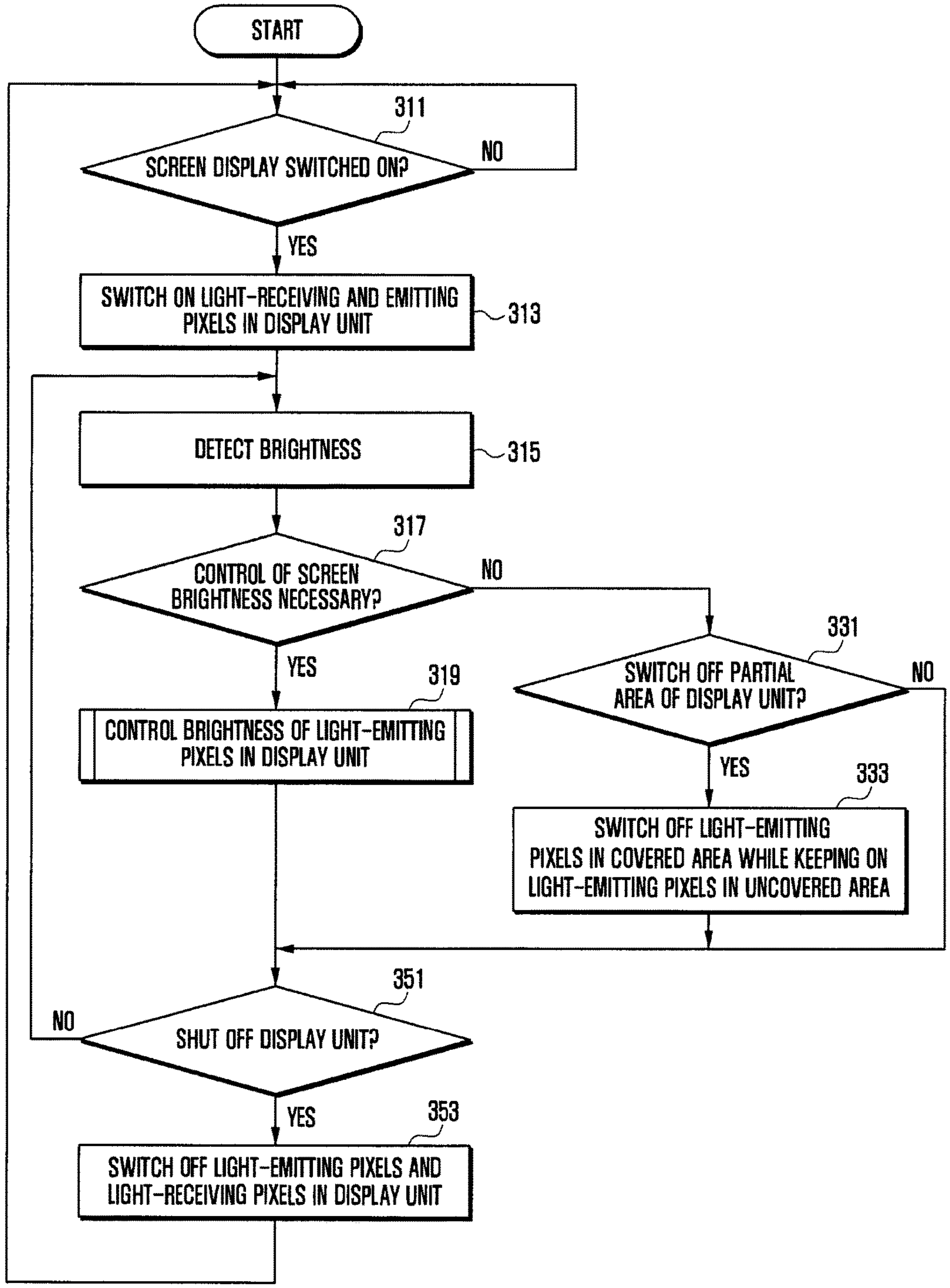
FIG. 3 is a flow chart illustrating an example method of controlling a screen display in an electronic device in accordance with aspects of the present disclosure.

Referring now to the example method shown in FIG. 3, control unit 100 identifies whether a screen display function is activated at operation 311. In one example, the operation of switching on the screen display is performed, if a button input or a request to execute an application is detected. When activation of display unit 130 is requested, control unit 100 instructs display unit 130 to activate the light-emitting pixels and light-receiving pixels at operation 313.

The light-receiving pixels may detect light and generate a signal to control unit 100. Control unit 100 may identify the brightness of the detected light based on the signal at operation 315. Control unit 100 may identify whether to adjust the brightness of display unit 130 by comparing the detected brightness to a predetermined threshold at operation 317. In one example, the control unit 100 identifies whether the brightness is dark enough to adjust the brightness of the display unit 130. At operation 319, the control unit 100 may adjust the screen brightness, if necessary, by adjusting the brightness of the light-emitting pixels at operation 319. A method for adjusting the screen display may be performed as shown in FIGS. 4A to 4C, which is explained in more detail below.

Figure 4A:
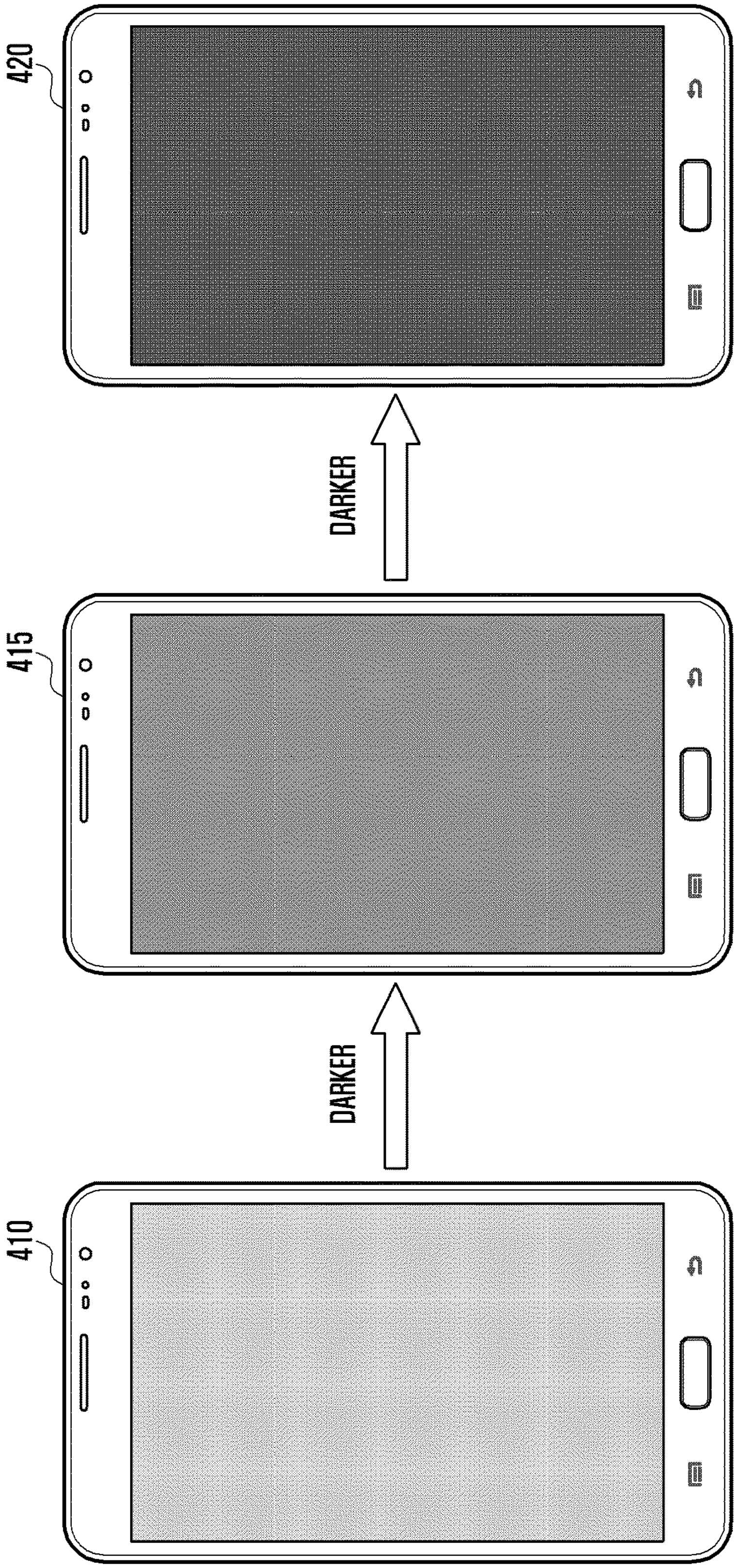
FIG. 4A, FIG. 4B and FIG. 4C are drawings illustrating a method for controlling the brightness of screen display in an electronic device.

Referring to FIG. 4A, the control unit 100 may adjust the whole screen of the display unit 130 in accordance with the brightness detected by the light receiving pixels. FIG. 4A illustrates an example of adjusting the screen brightness. If the surrounding brightness detected by the light-receiving pixels of display unit 130 is above a first and second threshold, control unit 100 may adjust the screen's brightness to a normal brightness, as shown in screenshot 410 of FIG. 4A. However, if the surrounding brightness is less than a first threshold, control unit 100 may adjust the screen brightness to be darker than normal, as shown in screenshot 415 of FIG. 4A. Furthermore, if the surrounding brightness is less than a first and second threshold, control unit 100 may adjust the screen's brightness to be even darker, as shown in screenshot 420.

As described above, control unit 100 may adjust the screen's brightness in accordance with the brightness detected by the light-receiving pixels of the display unit 130. For example, when the surrounding light becomes darker, the light-receiving pixels detects the change and control unit 100 adjusts the screen's brightness to a darker level by reducing the brightness of the light-emitting pixels.

Figure 4B:
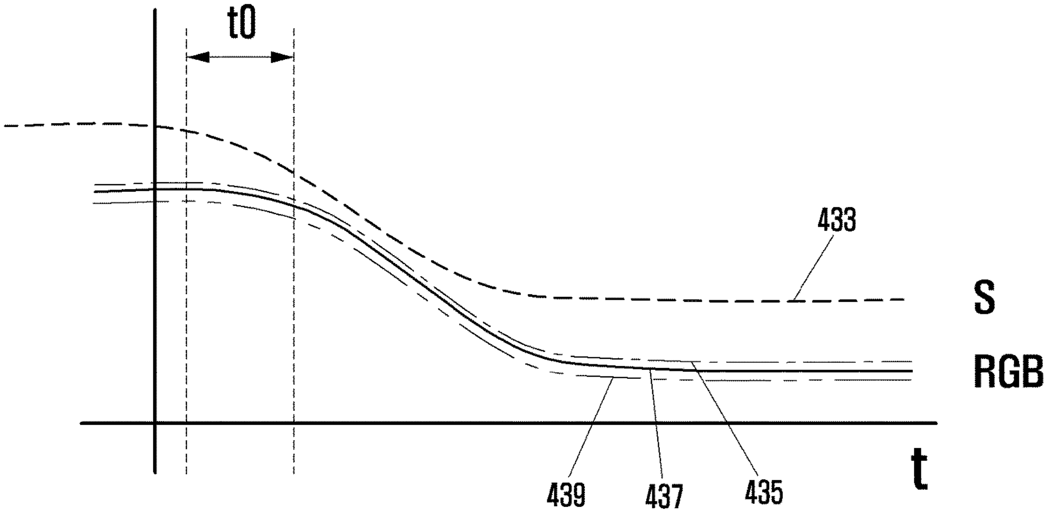
Figure 4C:
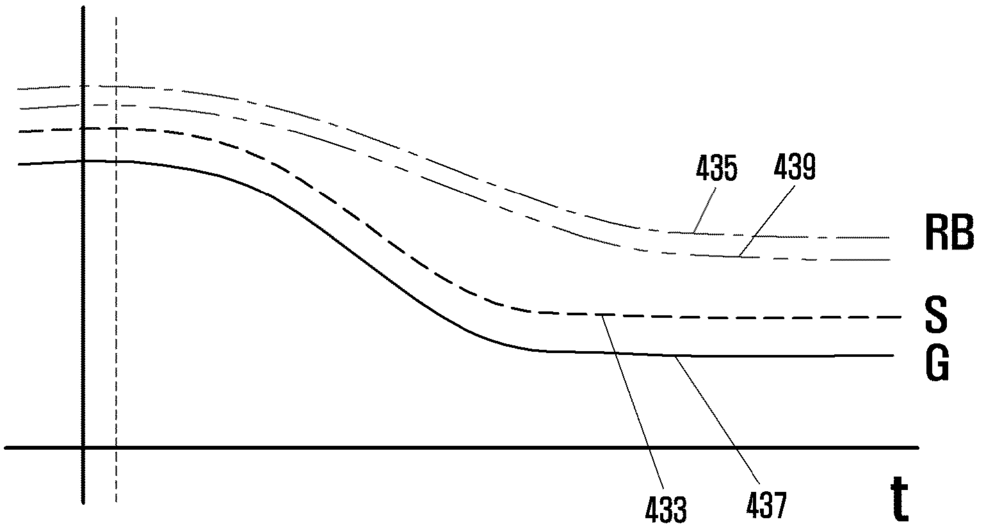

FIGS. 4B and 4C illustrate example changes in brightness of the light-emitting pixels. In FIGS. 4B and 4C, brightness line curve 433 indicates a the brightness detected by a light-receiving pixel, and brightness line curves 435, 437, and 439 indicate the brightness of the R, G, B light emitting pixels respectively. Here, control unit 100 may adjust the amount of emitting light if the amount of light coming into the light-receiving pixels of the display unit 130 decreases. In this example, when the amount of light coming into the light-receiving pixels are identified, a time T0 may be required to adjust the light intensity of the light-emitting pixels. After time T0 has elapsed, control unit 100 may adjust the light intensity of the light-emitting pixels as shown in FIG. 4B. Further, the control unit 100 may control the drivers of the light-emitting pixels of the display unit 130 by analyzing the wavelength of light detected by the light-receiving pixel. For example, the control unit 100 may adjust the brightness of the light-emitting pixels in accordance with the wavelength of light coming into the light-receiving pixels. FIG. 4C illustrates an example of the wavelength of light coming into a G pixel in the light-emitting pixel.

Referring back to FIG. 3, control unit 100 may adjust a part of the screen in accordance with the detection of light by the light-receiving pixels in that part of the screen. For example, control unit 100 may detect that the light in an area of the display unit 130 is blocked by an object (for example, a cover or a user's hand) such that no light is being received by the light-receiving pixels in that part of the screen. Control unit 100 may detect that a part of the screen is covered at operation 331, and may switch off the light-emitting pixels in the covered part of the screen, while keeping the light emitting pixels on in the uncovered part of the screen, at operation 333. At operation 351 control unit 100 may detect whether the device is being shut off; if so, control unit 100 may switch off the light emitting pixels and light receiving pixels at operation 353.

Figure 5A:
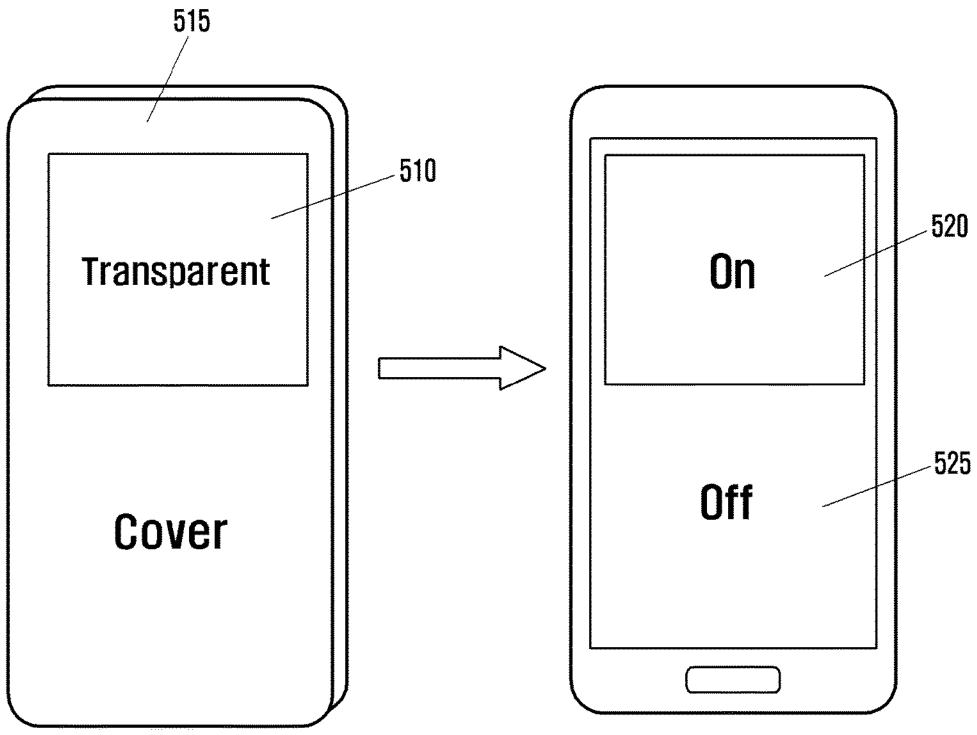
FIG. 5A, FIG. 5B and FIG. 5C are drawings illustrating a working example of controlling a display in accordance with aspects of the present disclosure.

Referring now to the working example in FIG. 5A, if a screen cover 515 having an uncovered area 510 is closed at operation 331, light-receiving pixels located in the uncovered area 510 may detect the light but the light-receiving pixels blocked by the cover 515 may not detect the light. Accordingly, control unit 100 may receive signals from the light-receiving pixels located in the uncovered area 510 and the closed area and may identify that a partial area of the display unit 130 is covered at operation 331. The control unit 100 may switch on the light-emitting pixels located in the uncovered area 510 as shown by the visible screen 520 of FIG. 5A and switches off the light-emitting pixels located in the covered area 525 at operation 333. In another example, if a cover having a transparent section and an opaque section is used with the electronic device as shown by FIG. 5A, the control unit 100 may identify the transparent section by detecting the amount of light coming into the light-receiving pixels mounted in the transparent section. The control unit 100 may then switch on the light-emitting pixels located in the transparent section of the display unit 130 and switch off or reduce the brightness of the light-emitting pixels located in the opaque section.

Figure 5B:
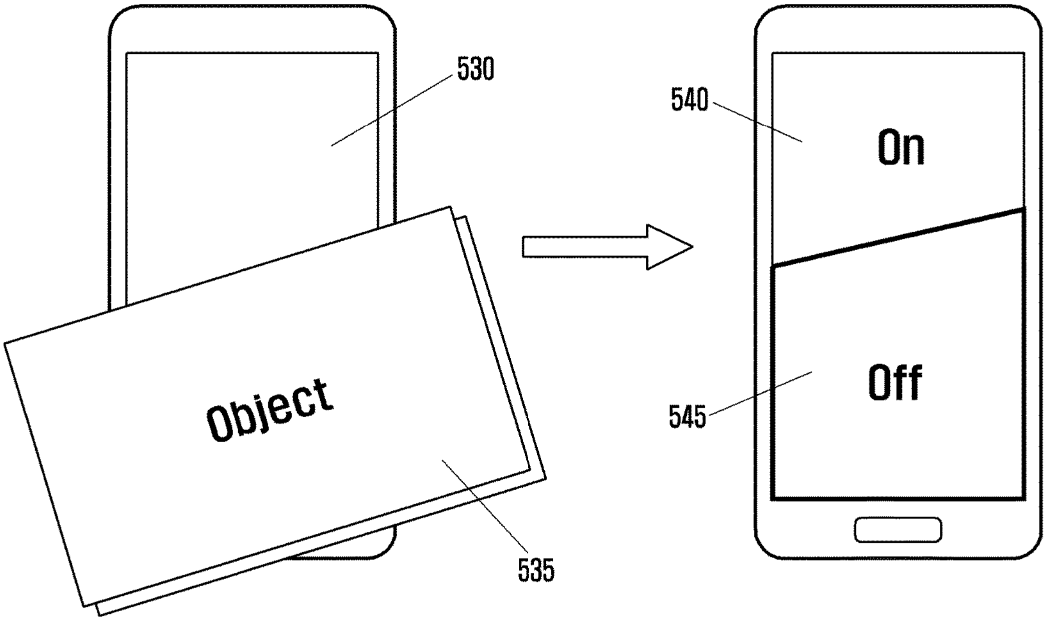

Referring now to the working example of FIG. 5B, if a partial area of the display unit 130 is covered by an opaque object 535 and the remaining area 530 is uncovered, control unit 100 may identify the area covered by the opaque object 535 by receiving signals from the light-receiving pixels covered by the object at operation 331. Control unit 100 may switch off the light-emitting pixels located in the area covered by the opaque object 535 or reduce the brightness at operation 333. Thus, control unit 100 may rearrange or resize the displayed information or data in the uncovered area 540 while maintaining the light emitting pixels off in the covered area 545.

Figure 5C:
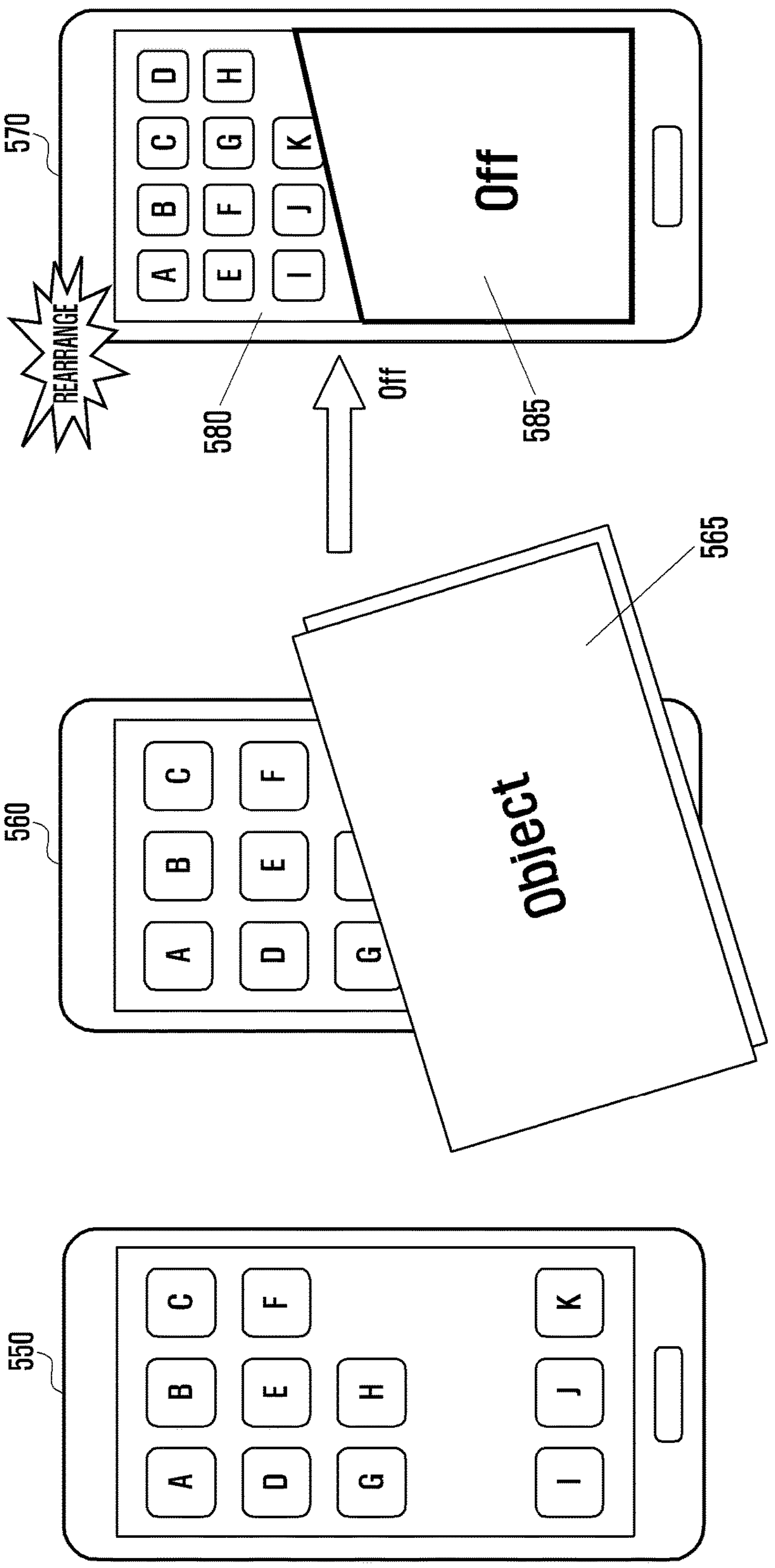

Referring now to the example of FIG. 5C, control unit 100 may detect when the object 565 covers the partial area of the display unit 130, when information is displayed, as shown by working example 550 and working example 560. The control unit 100 may then switch off or reduce the brightness of the light-emitting pixels located in the area 585 covered by the object 565, as shown by working example 570. In addition, the information displayed may be rearranged and resized to fit in the uncovered area 580 at operation 333. Accordingly, if a partial area of the display unit 130 is covered by object 565 as shown in FIG. 5C, control unit 100 may detect the covered and uncovered areas through the light-receiving pixels; reduce or shutoff the brightness of the covered area; and, rearrange and resize the information in the uncovered area. In another example, when a plurality of icons (or thumbnail images) is displayed on the screen of display unit 130, control unit 100 may switch off or reduce the brightness of the light-emitting pixels in the covered area and may rearrange and resize the icons (or thumbnail images) in the uncovered area.

Figure 6:
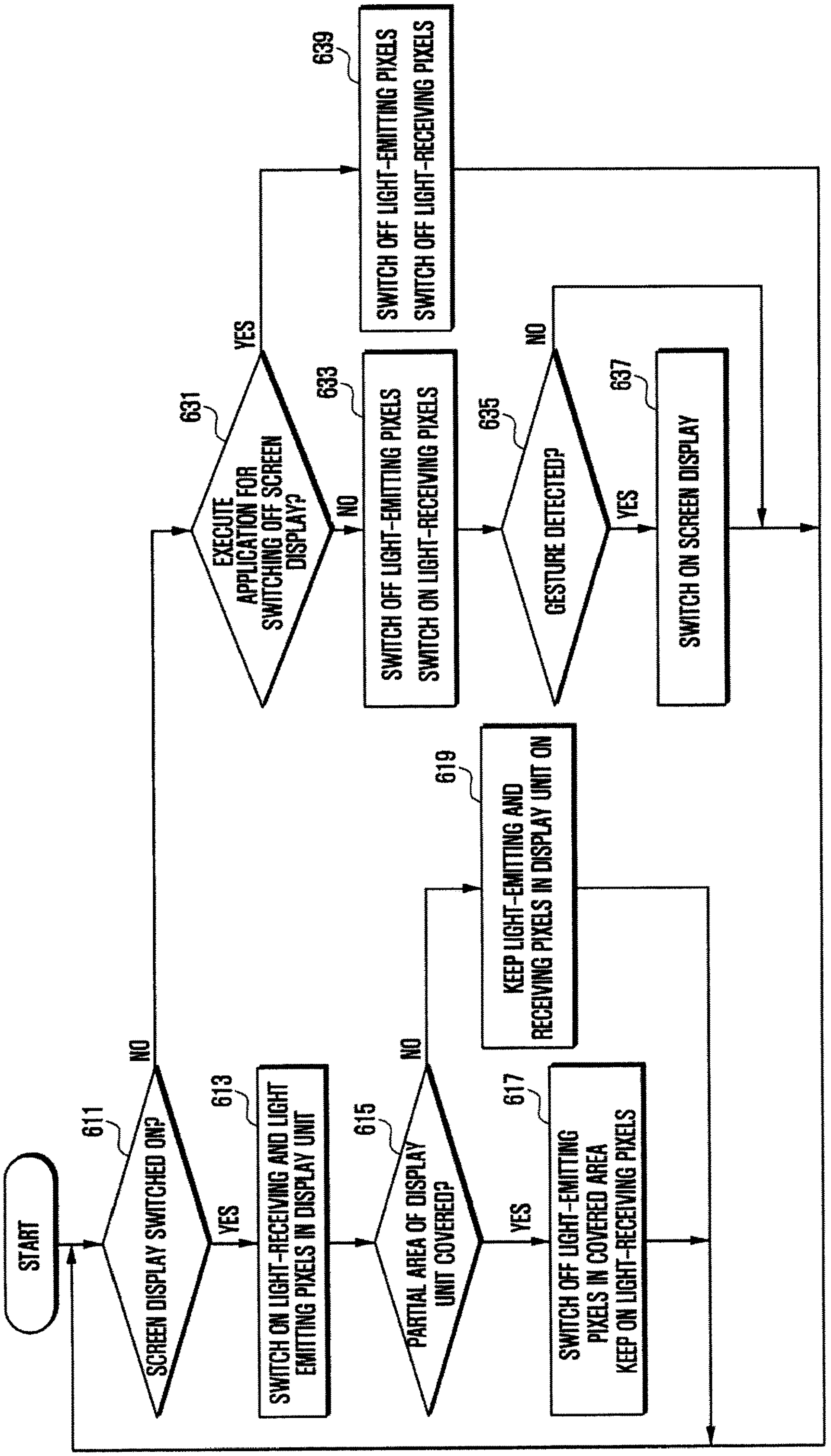
FIG. 6 is a flow chart illustrating another example method for controlling a screen display in accordance with aspects of the present disclosure.

Referring now to the example method in FIG. 6, the control unit 100 may identify whether a screen display function is activated at operation 611, and activates the display unit 130 at operation 613. In one example, the operation of switching on the screen display may be performed if a button input is detected in the electronic device or an event requesting execution of an application is detected. If activation of display unit 130 is requested, the control unit 100 displays data (e.g., text, images, icons, thumbnails, streaming movies, etc.) to display unit 130. At operation 613, the light-emitting pixels of display unit 130 may be used to display the data, and the light-receiving pixels detect the surrounding light.

The light-receiving pixels may detect the surrounding light and may output signals indicative of the surrounding light's brightness to control unit 100. The light-receiving pixels may be evenly disposed in a predetermined pattern across the surface area of display unit 130. As noted above, light-receiving pixels located in a covered area of the screen may not detect the light; accordingly, control unit 100 may identify that some of the light receiving pixels are covered at operation 615. If no part of the display is covered, the light emitting pixels and the light receiving pixels may be kept on, at operation 619. At operation 617, if a part of the display is covered, the light intensity of the light emitting pixels in the covered area may be reduced or shut down, while the light intensity of the light-emitting pixels in an uncovered area may be maintained, at operation 617. However, if no area of the display unit 130 is covered, the control unit 100 may maintain the brightness of all the light-emitting pixels mounted across the surface area of display unit 130.

As noted above, control unit 100 may detect an area of the screen covered by a hand or an object such that control unit 100 may adjust the light-emitting pixels located in the covered area. As such, control unit 100 may reduce power consumption by identifying the light detected by the light-receiving pixels in the display unit 130 and switching off the corresponding light emitting pixels arranged in an area covered by an object (e.g., a cover, object, or user's hand), as shown in FIGS. 5A and 5B. Further, if the light-emitting pixels in the covered area are switched off, the display information may be resized and rearranged in an uncovered area, as shown in FIG. 5C.

Referring back to FIG. 6, when the screen display is switched off, control unit 100 may determine whether the screen was turned off due to the execution of a shutdown application, at operation 631; If not, control unit 100 may switch off the light emitting pixels while keeping the light receiving pixels on at operation 633. Some applications among the applications installed in the electronic device may be executable while the display unit 130 is switched off; for example, when a music playback application executes, control unit 100 may shut down the display, when no other activity has occurred for a predetermined time, to preserve battery power. At operation 635, control unit 100 may detect a gesture and, if the gesture is detected, the light emitting pixels may be turned on again at operation 637. The gestures may include, but are not limited to, a hand touch, finger touch, stylus touch, or a sweep. However, if the screen has been shut down due to the execution of a shutdown application, this indicates that the device is being shut down; in this instance, control unit 100 may switch off the light-emitting pixels and the light receiving pixels at operation 639.

The method for switching on the light-receiving pixels when the device is turned on again may be applied as described in FIG. 3.

Advantageously, the brightness surrounding an entire or partial surface area of a display may be detected. In turn, the brightness of the whole or part of the display may be adjusted in order to preserve battery life.

The above-described examples may be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor", "controller", "control unit" or "microprocessor" constitute hardware in the claimed invention. Under the broadest reasonable interpretation, the appended claims constitute statutory subject matter in compliance with 35 U.S.C. § 101. The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. understood as comprising software per se.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. A method for controlling a screen display in an electronic device, the method comprising:

detecting a signal from a plurality of light-receiving pixels of a display unit comprising a plurality of light-emitting pixels and the plurality of light receiving pixels arranged in a predetermined pattern; and if brightness of light indicated by the signal from the plurality of light-receiving pixels in a partial area of the screen display is less than brightness of light indicated by the signal from the light-receiving pixels in another area of the screen display, switching off the plurality of light-emitting pixels arranged in the partial area of the screen display, wherein the signal from the plurality of light-receiving pixels indicates a wavelength of light such that only a display intensity of colored sub-pixels in the plurality of light-emitting pixels corresponding to the wavelength of light is adjusted to be lower than the brightness of light indicated by the signal from the plurality of light-receiving pixels.

2. The method of claim 1, wherein the plurality of light-emitting pixels are RGB pixels and the plurality of light-receiving pixels comprises image sensors.

3. The method of claim 2, wherein switching off the plurality of light-emitting pixels arranged in the partial area of the display unit comprises switching off the plurality of light-emitting pixels arranged in the partial area of the display unit when the light-receiving pixels in the partial area are covered by an object.

4. The method of claim 3, wherein the object is a cover having an opening that allows light to reach an uncovered area of the display unit such that the plurality of light-emitting pixels in the uncovered area are switched on due to light being detected by the plurality of light-receiving pixels in the uncovered area.

5. The method of claim 4, wherein data displayed on the display unit is rearranged and resized into the uncovered area so as to allow the data to be displayed through the uncovered area.

6. A method for controlling a screen display in an electronic device, the method comprising:

detecting a signal from a plurality of light-receiving pixels of a display unit, the display unit comprising a plurality of light-emitting pixels and the plurality of light receiving pixels arranged in a predetermined pattern across a surface area of the display unit;

adjusting a brightness intensity of the plurality of light-emitting pixels based at least partially on the detected signal and a predetermined threshold of brightness; and if brightness of light indicated by the signal from the plurality of light-receiving pixels in a partial area of the display unit is less than brightness of light indicated by the signal from the light-receiving pixels in another area of the display unit, switching off the plurality of light-emitting pixels arranged in the partial area of the display unit, wherein the signal from the plurality of light-receiving pixels indicates a wavelength of light such that only a display intensity of colored sub-pixels in the plurality of light-emitting pixels corresponding to the wavelength of light is adjusted to be lower than the brightness of light indicated by the signal from the plurality of light-receiving pixels.

7. The method of claim 6, wherein the plurality of light-emitting pixels are RGB pixels and the plurality of light-receiving pixels comprises image sensors disposed in conjunction with the plurality of light emitting pixels in the predetermined pattern.

8. The method of claim 7, wherein switching off the plurality of light-emitting pixels arranged in the partial area of the display unit comprises switching off the plurality of light-emitting pixels in the partial area of the display unit, when the plurality of light-receiving pixels in the partial area of the display unit are covered by an object such that light is not detectable by the plurality of light-receiving pixels.

9. The method of claim 8, wherein the object is a cover having an opening that allows light to reach an uncovered area of the display unit such that the plurality of light-emitting pixels in the uncovered area are switched on due to light being detected by the plurality of light-receiving pixels in the uncovered area.

10. The method of claim 9, wherein data displayed on the display unit is rearranged and resized into the uncovered area so as to allow the data to be displayed through the uncovered area.

11. An apparatus for controlling a screen display in an electronic device, the apparatus comprising:

a display unit including a plurality of light-emitting pixels and a plurality of light-receiving pixels in a predetermined pattern; and at least one processor configured to:

detect a signal from the plurality of light-receiving pixels; and switch off the plurality of light-emitting pixels arranged in a partial area of the screen display, if brightness of light indicated by the signal from the plurality of light-receiving pixels in the partial area is less than brightness of light indicated by the signal from the light-receiving pixels in another area of the screen display, wherein the signal from the plurality of light-receiving pixels indicates a wavelength of light such that only a display intensity of colored sub-pixels in the plurality of light-emitting pixels corresponding to the wavelength of light is adjusted to be lower than the brightness of light indicated by the signal from the plurality of light-receiving pixels.

12. The apparatus of claim 11, wherein the plurality of light-emitting pixels are RGB light-emitting pixels.

13. The apparatus of claim 12, wherein the plurality of light-receiving pixels comprises image sensors.

14. The apparatus of claim 11, wherein data displayed on the display unit is rearranged and resized into an uncovered area of the display unit in which the plurality of light-receiving pixels do detect light, when the plurality of light-receiving pixels in the partial area of the display unit do not detect light.

* * * * *